US010073370B2

(12) United States Patent
Takikawa et al.

(10) Patent No.: US 10,073,370 B2
(45) Date of Patent: Sep. 11, 2018

(54) IMAGE PROCESSING APPARATUS, METHOD OF CONTROLLING SAME, AND IMAGE FORMING APPARATUS

(71) Applicant: CANON KABUSHIKI KAISHA, Tokyo (JP)

(72) Inventors: Yoichi Takikawa, Kawasaki (JP); Ryosuke Otani, Tokyo (JP); Hidenori Kanazawa, Mishima (JP); Go Araki, Suntou-gun (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/352,882

(22) Filed: Nov. 16, 2016

(65) Prior Publication Data

US 2017/0139344 A1 May 18, 2017

(30) Foreign Application Priority Data

Nov. 16, 2015 (JP) ................................ 2015-224233

(51) Int. Cl.
*H04N 1/60* (2006.01)
*G06F 15/00* (2006.01)
*G06K 1/00* (2006.01)
*G03G 15/043* (2006.01)

(52) U.S. Cl.
CPC .................................. *G03G 15/043* (2013.01)

(58) Field of Classification Search
CPC .................................................... G03G 15/043
USPC .................. 358/1.9, 1.15, 500; 382/163, 164
See application file for complete search history.

(56) References Cited

U.S. PATENT DOCUMENTS 5,229,790 A * 7/1993 Matsuura ............ G03G 15/326 347/140
9,485,388 B2 11/2016 Kodama et al.
2014/0355010 A1 12/2014 Hara et al.
2014/0376056 A1 12/2014 Fujimoto et al.
2015/0331351 A1* 11/2015 Suhara ................ G03G 15/043 347/118
2016/0004942 A1 1/2016 Sumi et al.
2016/0209773 A1 7/2016 Otani
2017/0041502 A1 2/2017 Fuse et al.
2017/0111547 A1 4/2017 Otani et al.
2017/0111548 A1 4/2017 Yamamoto et al.
(Continued)

FOREIGN PATENT DOCUMENTS

JP 2006-349851 A 12/2006

*Primary Examiner* — Quang N Vo
(74) *Attorney, Agent, or Firm* — Carter, DeLuca, Farrell & Schmidt, LLP

(57) ABSTRACT

The present invention performs inplane uneven density correction that suppresses a number of tone correction properties and has few correction residuals. Accordingly, a correction unit corrects pixel data D based on a plurality of tone correction properties respectively corresponding to a plurality of spot diameters of a light to expose on a surface of a photoreceptor, and to generate a plurality of pieces of correction data D1 and D2. A setting unit sets a ratio Rb based on a spot diameter on the photoreceptor of a pixel corresponding to the pixel data D. A blending unit generates tone correction data Dc by blending the plurality of pieces of correction data D1 and D2 based on the ratio Rb.

12 Claims, 12 Drawing Sheets

(56) References Cited

U.S. PATENT DOCUMENTS

| | | | |
|---|---|---|---|
| 2017/0139363 | A1 | 5/2017 | Takikawa et al. |
| 2017/0142290 | A1 | 5/2017 | Fuse et al. |

* cited by examiner

FIG. 6A

| POSITION | SPOT DIAMETER |
| --- | --- |
| -128 | 100 |
| -127 | 99 |
| -126 | 98 |
| ⋮ | ⋮ |
| -2 | 71 |
| -1 | 70 |
| 0 | 70 |
| 1 | 70 |
| 2 | 71 |
| ⋮ | ⋮ |
| 125 | 97 |
| 126 | 98 |
| 127 | 99 |

FIG. 6B

| SPOT DIAMETER | RATIO Rb |
| --- | --- |
| 70 | 0.00 |
| 71 | 0.01 |
| 72 | 0.02 |
| ⋮ | ⋮ |
| 98 | 0.92 |
| 99 | 0.96 |
| 100 | 1.00 |

FIG. 9

| SPOT DIAMETER | LIGHT INTENSITY SIGNAL VALUE |
|---|---|
| 70 | 82 |
| 71 | 82 |
| 72 | 83 |
| ⋮ | ⋮ |
| 98 | 99 |
| 99 | 100 |
| 100 | 100 |

IMAGE PROCESSING APPARATUS, METHOD OF CONTROLLING SAME, AND IMAGE FORMING APPARATUS

BACKGROUND OF THE INVENTION

Field of the Invention

The present invention relates to processing of image data in an image formation of an electrophotographic method.

Description of the Related Art

As exposure methods employed in an exposure unit of an electrophotographic image forming apparatus, there are an LED exposure method and a laser exposure method. The LED exposure method arranges a plurality of LED elements that are light-emitting elements in a lengthwise direction of a photoreceptor, and provides a plurality of lenses that focus light outputted by the LED elements on the photoreceptor. The laser exposure method has a light source unit that emits a laser beam by a semiconductor laser that is a light-emitting element, and a scanning unit that performs a laser beam deflecting scan by a polygon mirror. The laser exposure method further guides the laser beam from the light source unit to the scanning unit and has a plurality of lenses for forming an image using the laser beam, with which a deflecting scan is performed by the scanning unit, on the photoreceptor.

It is desirable for a light intensity distribution formed on a photoreceptor surface (hereinafter, a spot shape) to be approximately circular, and it is desirable for the size of the spot shape (hereinafter, spot diameter) to be approximately uniform irrespective of a position on the photoreceptor surface. Therefore, light output from the light-emitting element is designed so as to form an image by approximately uniform spot diameters on a photoreceptor surface after passing through a lens group.

In recent years, there are design examples in which, for an objective of miniaturization or a cost reduction, lens characteristics are simplified and spot diameters are not necessarily uniform. In addition, even with a design in which spot diameters are made to be uniform, there are cases in which there is an effect from distortion due to assembly error or a manufacturing error of a component part or a supporting body, so spot diameters change, and uniform spot diameters cannot be achieved. Nonuniformity of spot diameters appears in an output image as a difference in a tone characteristic depending on the scanning position, and causes so-called inplane uneven density to occur.

Japanese Patent Laid-Open No. 2006-349851 (hereinafter, PTL 1) discloses a technique for holding, with respect to each position in a main scanning direction, a plurality of two-dimensional tables for performing density correction in accordance with tonal values of an input image. To allow sufficient suppression of inplane uneven density by this technique, it is necessary to increase the number of the two-dimensional tables to be held for the density correction. By PTL 1, a test pattern having uniform density in a main scanning direction and a density gradient in a sub scanning direction is formed, a density of the test pattern is detected, and a correction table for correcting density unevenness of the main scanning direction is created. The test pattern is something that arranges a plurality of patches at equal intervals on an entire region of the main scanning direction.

By the technique of PTL 1, although an optimal correction table can be obtained for representative points that divide the main scanning direction into equal intervals (16 points in accordance with FIGS. 4 and 8 of PTL 1), correction residuals occur at other points. To have sufficiently small correction residuals, it is necessary to increase a number of divisions of the main scanning direction. However, increasing the number of divisions leads to an increase of a number of correction tables.

SUMMARY OF THE INVENTION

An objective of the present invention is to perform inplane uneven density correction that suppresses a number of tone correction properties and has few correction residuals.

According to an aspect of the present invention, there is provided an image processing apparatus comprising: a correction unit configured to correct pixel data based on a plurality of tone correction properties respectively corresponding to a plurality of spot diameters of a light to expose on a surface of a photoreceptor, and to generate a plurality of pieces of correction data; a setting unit configured to set a ratio based on a spot diameter on the photoreceptor of a pixel corresponding to the pixel data; and a blending unit configured to generate tone correction data by blending the plurality of pieces of correction data based on the ratio.

By virtue of the present invention, it is possible to perform inplane uneven density correction that suppresses a number of tone correction properties and has few correction residuals.

Further features of the present invention will become apparent from the following description of exemplary embodiments (with reference to the attached drawings).

BRIEF DESCRIPTION OF THE DRAWINGS

FIGS. 6A and 6B are views for illustrating an example of a spot diameter table and an example of a blend ratio table.

FIG. 9 is a view illustrating an example of a light intensity table.

DESCRIPTION OF THE EMBODIMENTS

Below, with reference to the drawings description is given in detail of an image forming apparatus, an image processing apparatus, and an image processing method of an embodiment according to the present invention. Note that these embodiments do not limit the present invention according to the scope of the claims, and not all of the combinations of configurations described in the embodiments are necessarily required with respect to the means to solve the problems according to the present invention.

First Embodiment

Figure 1A:
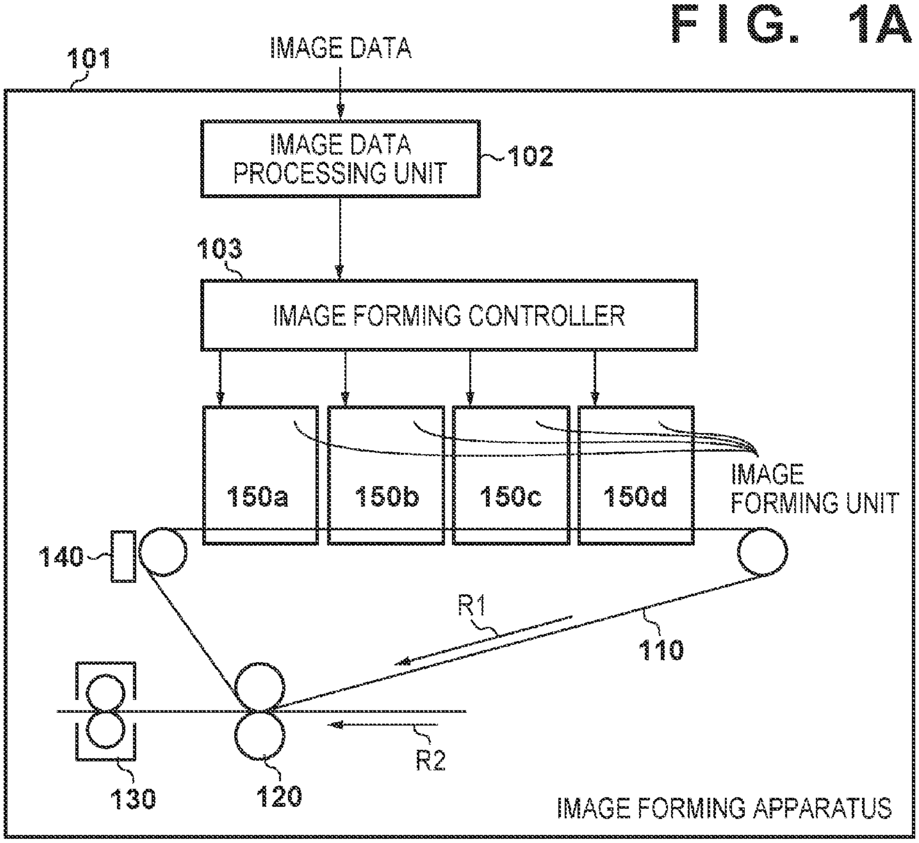
FIGS. 1A and 1B are views illustrating an overview configuration of the image forming apparatus of an embodiment.
Figure 1B:
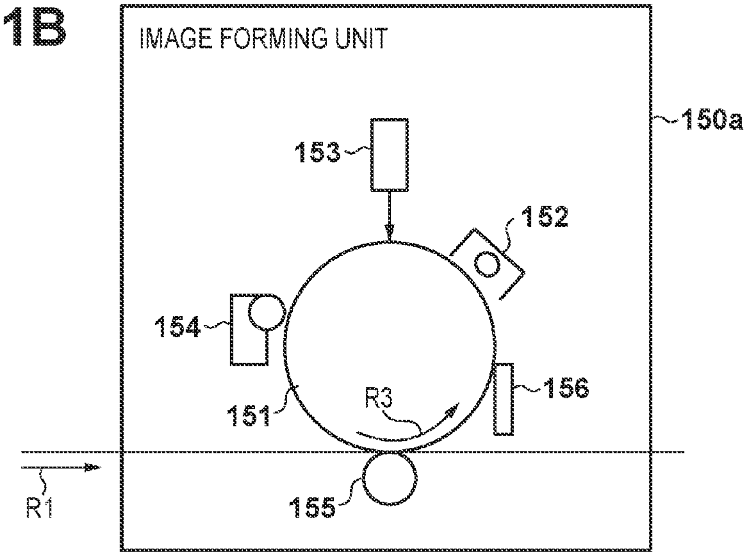

FIGS. 1A and 1B are views illustrating an overview configuration of an image forming apparatus 101 of an embodiment. As illustrated in FIG. 1A, the image forming apparatus 101 has a secondary transfer unit 120, an intermediate transfer belt cleaning unit 140, and image forming units 150*a*, 150*b*, 150*c*, and 150*d* along an intermediate transfer belt 110. A fixing unit 130 is arranged on a downstream side of the secondary transfer unit 120 (a downstream side in a conveyance direction for print paper). Explanation is given later for an image data processing unit 102 and an image forming controller 103.

Image Forming Unit

FIG. 1B illustrates an example configuration of the image forming unit 150*a*. It has a charging unit 152, an exposure unit 153, a developing unit 154, a primary transfer unit 155, and a cleaning unit 156 in a vicinity of a photoreceptor 151. The image forming units 150*a*, 150*b*, 150*c*, and 150*d* have the same configuration except for a point of using respectively different colored toners. As the toner, commonly four toner colors of cyan C, magenta M, yellow Y, and black K are used, and the image forming unit 150*a* uses C toner, the image forming unit 150*b* uses M toner, the image forming unit 150*c* uses Y toner, and the image forming unit 150*d* uses K toner. Note that image forming units and colors are not limited to four types, and image forming units and toner corresponding to light colors (light cyan Lc, light magenta Lm, grey Gy) or clear CL may be present. In addition, there is no limitation to an order of layering colors (an arrangement order of image forming units), which may be any order.

Operation of Image Forming Apparatus

The photoreceptor 151 has an organic photoconductor layer for which a charging polarity on an outer circumferential face thereof is a negative polarity, and rotates in a direction of an arrow symbol R3 illustrated in FIG. 1B. For the charging unit 152, a negative voltage is applied, and charged particles are irradiated on a surface of the photoreceptor 151 to cause the surface of the photoreceptor 151 to be uniformly charged to a negative potential. The exposure unit 153 irradiates a laser beam on the photoreceptor 151 in accordance with a drive signal input from the image forming controller 103, for example, and forms an electrostatic latent image on the surface of the charged photoreceptor 151.

The developing unit 154 uses a developing roller that rotates at approximately constant speed to supply toner charged to a negative polarity to the photoreceptor 151, causes the toner to adhere to the electrostatic latent image of the photoreceptor 151, and performs a reversal development of the electrostatic latent image. For the primary transfer unit 155, a positive voltage is applied, and it performs a primary transfer of the toner image, which is charged to a negative polarity and carried by the photoreceptor 151, to the intermediate transfer belt 110 that moves in a direction of an arrow symbol R1 illustrated in FIG. 1B. The cleaning unit 156 removes a remaining toner image that remains on the surface of the photoreceptor 151 after passing the primary transfer unit 155. The image forming units 150*a*, 150*b*, 150*c*, and 150*d* perform similar operations. When forming a color image, the image forming units 150*a*, 150*b*, 150*c*, and 150*d* execute each step of charging, exposing, developing, primary transfer, and cleaning at timing shifted by a predetermined interval. As a result, a full color toner image on which toner images of four colors have been overlapped is formed on the intermediate transfer belt 110.

The secondary transfer unit 120 performs a secondary transfer of the toner image carried on the intermediate transfer belt 110 to a print paper conveyed in a direction of an arrow symbol R2 illustrated in FIG. 1A. The fixing unit 130 performs pressurization and heating of the print paper to which the toner image has been transferred, and causes the toner image to fix to the print paper. The intermediate transfer belt cleaning unit 140 removes remaining toner that remains on the intermediate transfer belt 110 after passing the secondary transfer unit 120.

Image Data Processing Unit

Figure 2:
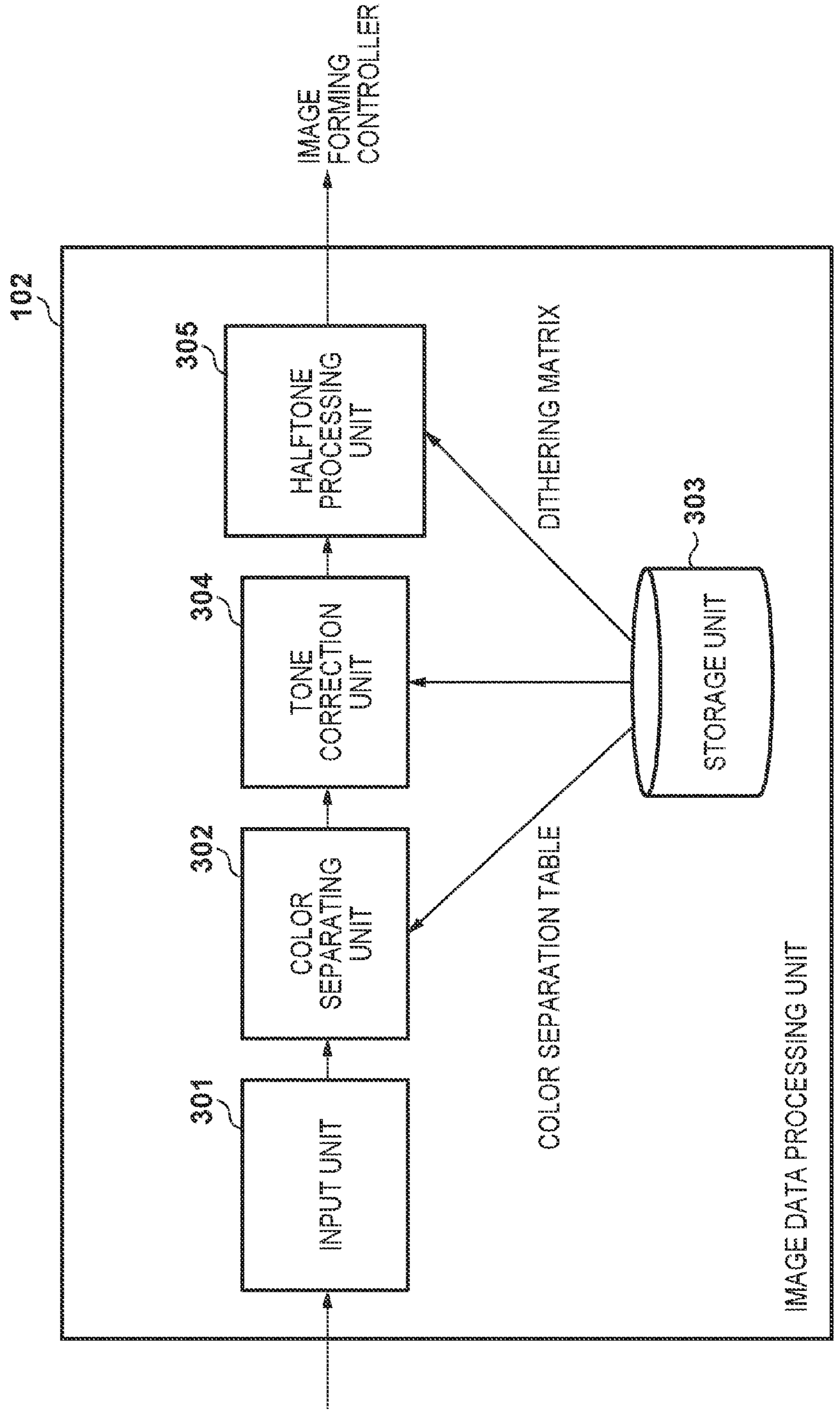
FIG. 2 is a block diagram illustrating an example configuration of an image data processing unit.

An example configuration of the image data processing unit 102 is illustrated by the block diagram of FIG. 2. An input unit 301 inputs multivalued image data (for example, 8 bits for each of RGB) from an external device such as a computer device, and converts a resolution of the image data into a print resolution of the image forming apparatus 101.

A color separating unit 302 refers to a color separation table stored in a storage unit 303, and performs a color decomposition of input image data into image data of each color of CMYK (for example, 8 bits for each of CMYK). For a tone correction unit 304 detail is described below, but it performs a tone correction process on image data of each color of CMYK based on information stored in the storage unit 303. A halftone processing unit 305 performs halftone processing on image data of each color of CMYK after tone correction, to convert it to image data of 4 bits for each of CMYK for example. Note that the halftone processing is performed by using a dither matrix stored in the storage unit 303, for example.

The image data processing unit 102 can also be configured as software. In such a case, in a computer device in which a program for the software is installed, the image data processing unit 102 functions as a printer driver for example.

Spot Diameter and Tone Characteristic

Figure 3A:
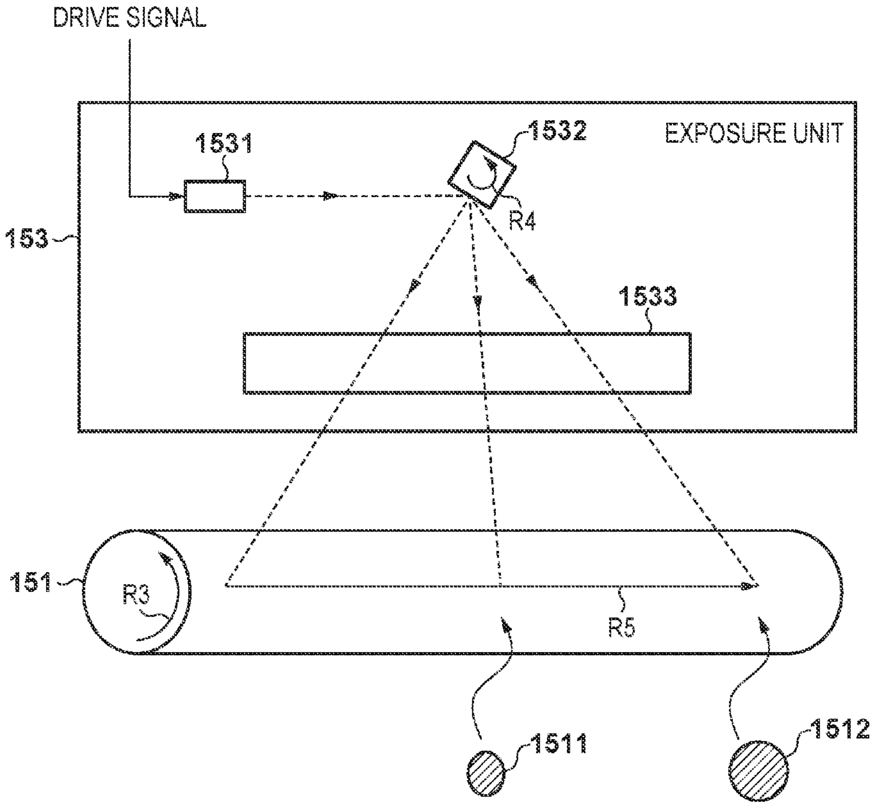
FIGS. 3A-3D are views for describing a spot shape and a tone characteristic of light exposed on a surface of a photoreceptor.

As previously explained, it is desirable for a spot shape formed on a surface of the photoreceptor 151 to be approximately circular, and the spot diameter to be approximately uniform irrespective of the position on the surface of the photoreceptor 151. However, there are cases in which the spot diameter is not uniform due to simplification of lens characteristics through an objective of miniaturization or a cost reduction, or manufacturing error or assembly error of a component part or a supporting body. FIGS. 3A-3D are views for describing spot shapes and tone characteristics of light exposed on a surface of the photoreceptor 151. A light-emitting element 1531 of the exposure unit 153 illustrated in FIG. 3A is configured by one or a plurality of semiconductor laser elements. A laser beam output by the light-emitting element 1531 passes a collimating lens, an aperture stop, and a cylindrical lens (not shown), is reflected by a reflecting surface of a polygon mirror 1532 to then pass through an optical element 1533, and to form an image on a surface of the photoreceptor 151.

The laser beam reflected by the reflecting surface of the polygon mirror 1532 which rotates at a fixed speed in a direction of the arrow symbol R4 illustrated in FIG. 3A makes a deflecting scan in a direction of the arrow symbol R5 (a main scanning direction) on the photoreceptor 151. Ordinarily design is such that, by operation of the optical element 1533, a laser beam forms an image by an approximately uniform spot diameters on the surface of the photoreceptor 151. However, there are cases where the spot diameter is not necessarily uniform due to the above reasons.

For example, there are cases in which a diameter of a spot shape 1512 of an end portion of the main scanning direction of the photoreceptor 151 becomes larger than a diameter of a spot shape 1511 of a central portion of the main scanning direction of the photoreceptor 151. If the spot diameter is non-uniform, a problem occurs in that a tone characteristic of an output image differs in accordance with the spot diameter. Note that the tone characteristic indicates a correspondence relationship between the density indicated by input image data and the density of an output image. Description is given below of a case, as illustrated in FIG. 3A, in which the spot diameter becomes larger the closer the main scanning direction gets to an end portion, in comparison to the spot diameter at a central portion of the main scanning direction.

Figure 3B:
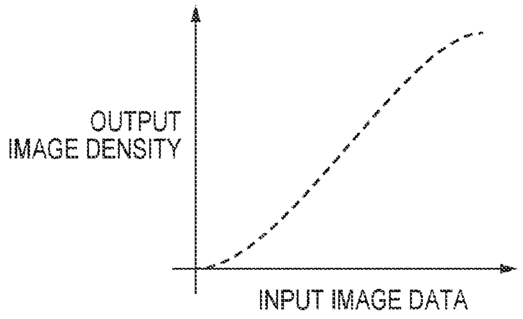
Figure 3C:
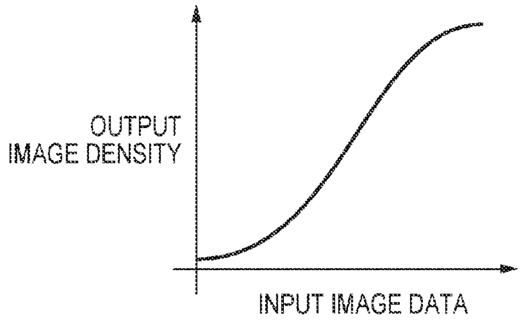
Figure 3D:
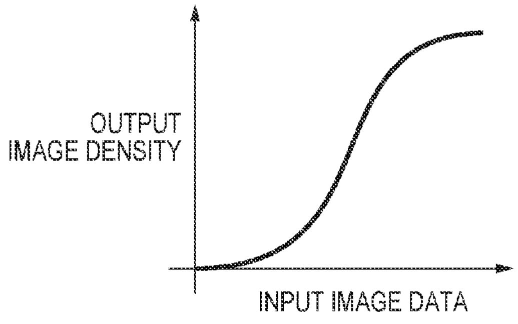

FIG. 3B illustrates a tone characteristic at a position where the spot diameter at a central portion of the main scanning direction becomes smallest. FIG. 3D illustrates a tone characteristic at a position where the spot diameter at an end portion of the main scanning direction largest. FIG. 3C illustrates a tone characteristic at an intermediate position between the central portion and an end portion (a position where the spot diameter has an intermediate size). As illustrated in FIGS. 3B, 3C, and 3D, it is known that as the spot diameter increases, curvature of graph indicating a tone characteristic becomes big. The reason is that, if the spot diameter is large, in a highlight portion an independent dot for which exposure intensity has become weak due to spreading of the spot diameter is formed on the photoreceptor, and density decreases due to a toner apply amount for the independent dot decreasing. Meanwhile, in a shadow portion, a toner apply amount for a blank portion having a narrow width increases due to spreading of the spot diameter, and density increases. In other words, the tone characteristic of an output image changes in accordance with a spot diameter that depends on a position, and inplane uneven density occurs.

A tone correction process for making a relation between the tone characteristic of image data and the tone characteristic of an output image to be linear is processing that uses a tone correction table having a characteristic inverse to the tone characteristic of the output image to transform the image data. Unlike a tone correction process for image data, tone correction properties corresponding to a position on the photoreceptor 151 are necessary to suppress inplane uneven density caused by a change of a tone characteristic in relation to the position on the photoreceptor 151. However, if tone correction properties for all positions on the photoreceptor 151 are created and held in a tone correction table, this invites an increase in effort for calibration (adjustment of tone correction properties) and an increase in a memory region for holding the tone correction table, and is not practical.

Accordingly, it is possible to consider holding tone correction properties adjusted at representative positions on the photoreceptor 151 (hereinafter, representative tone correction properties), and generating the tone correction properties for other positions (hereinafter, non-representative positions) from representative tone correction properties. In other words, representative positions are arranged evenly spaced apart on the photoreceptor 151, and tone correction properties of a non-representative position are generated by a linear interpolation of representative tone correction properties for two nearest neighbors. In such a case, if the distances between the non-representative position and nearest neighbor representative positions P1 and P2 are L1 and L2, tone correction properties for the non-representative position are generated by mixing (blending) at a ratio of L2:L1 the tone correction properties of the representative position P1 and the tone correction properties of the representative position P2.

Tone correction properties for a position other than a representative position differ to something that is truly optimal, and a slight correction residual occurs in the tone characteristic. It is possible to reduce the correction residual by increasing the number of representative positions. In other words, there is a trade-off relation between a number of tables that hold representative tone correction properties and suppression of inplane uneven density.

Figure 4:
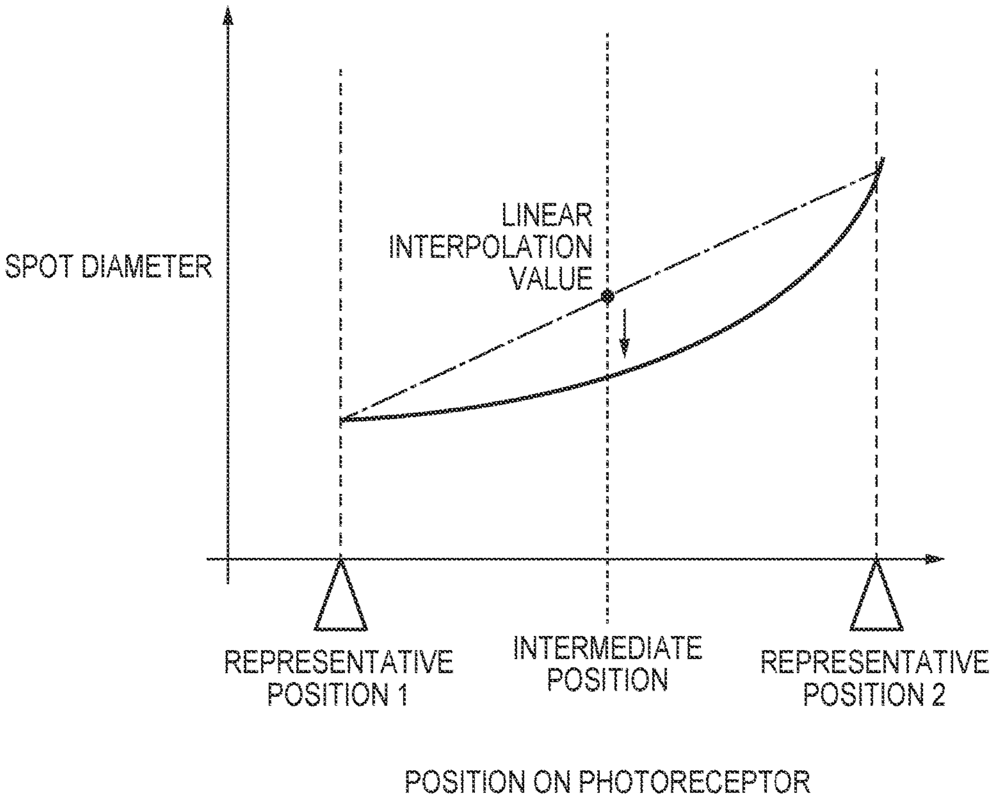
FIG. 4 is a view illustrating an example of a relation between a position in the main scanning direction on the photoreceptor and change of the spot diameter.

Such a correction residual occurs because change of the spot diameter in the main scanning direction on the photoreceptor 151 is not uniform. FIG. 4 illustrates an example of a relation between change of the spot diameter and a position in the main scanning direction on the photoreceptor 151. FIG. 4 illustrates a case in which change of the spot diameter is small in a vicinity of a representative position 1, and change of the spot diameter is sharp in a vicinity of a representative position 2. Considering such change of the spot diameter, it is necessary that a tone correction property of an intermediate position between the representative position 1 and the representative position 2, rather than be a linear interpolation therebetween, approach more to the tone correction property of the representative position 1 in the example of FIG. 4.

Accordingly, at least two tone correction properties corresponding to different spot diameters are created and held as two tone correction tables. The tone correction property of a non-representative position is set by blending tone correction properties indicated by the tone correction tables at a ratio according to the spot diameter. As a result, it is possible to reduce a correction residual due to change of the spot diameter in the main scanning direction not being uniform when correcting a problem in which tone characteristics of an output image are different in accordance with the spot diameter. In the present embodiment, although two tone correction properties are held, it is possible to realize sufficient correction precision with respect to a non-representative position because blending that considers the spot diameter is performed.

Tone Correction Unit

Figure 5:
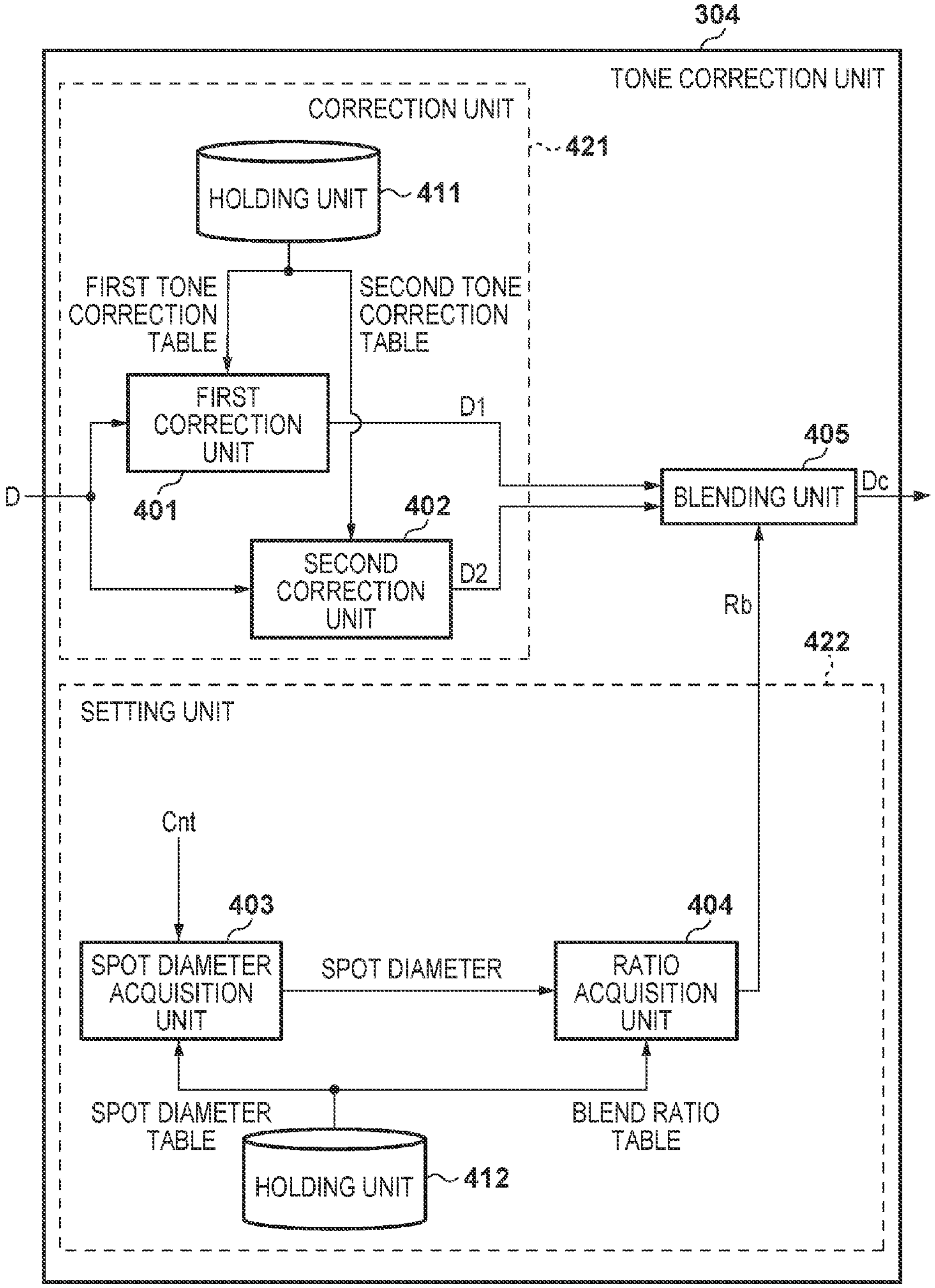
FIG. 5 is a block diagram illustrating an example configuration of a tone correction unit.

An example configuration of the tone correction unit 304 is illustrated by the block diagram of FIG. 5. The tone correction unit 304 has a correction unit 421 for generating a plurality of pieces of correction data by performing a tone correction on image data of each color of CMYK generated by the color separating unit 302, a setting unit 422 for setting a blend ratio of the plurality of pieces of correction data, and a blending unit 405.

In the correction unit 421, a first correction unit 401 uses a first tone correction table held by a holding unit 411 to generate first correction data D1 for which a tone correction process is performed on pixel data D input from the color separating unit 302. A second correction unit 402 uses a second tone correction table held by the holding unit 411 to generate second correction data D2 for which a tone correction process is performed on the pixel data D.

The first tone correction table has tone correction properties designed so that a desired tone characteristic can be achieved for a spot diameter (a first spot diameter) at a central portion of the photoreceptor 151. The second tone correction table has tone correction properties designed so that a desired tone characteristic can be achieved for a spot diameter (a second spot diameter) at an end portion of the photoreceptor 151.

In the embodiment, because a case in which the spot diameter becomes larger towards the end portion of the main scanning direction in comparison to the spot diameter at the central portion of the main scanning direction is explained, the first and second tone correction tables have the above configuration. It is sufficient if the first tone correction table and the second tone correction table correspond to two different spot diameters SS1 and SS2, and that the spot diameters satisfy the following equation is desirable.

$$SS1 \leq \text{spot diameter at particular position} \leq SS2 \quad (1)$$

The spot diameter acquisition unit 403 calculates a formation position Pp on the photoreceptor 151 for the processed-pixel and acquires a spot diameter from the spot diameter table held by the holding unit 412. FIG. 6A is a view illustrating an example of a spot diameter table. A spot diameter table illustrated in FIG. 6A, which takes a left side of the photoreceptor 151 as −128, 0 for the center, and the right side as 127, holds spot diameters for several positions between −128 corresponding to the left side and 127 corresponding to the right side (in FIG. 6A the positions correspond to integers). In such a case, the formation position Pp on the photoreceptor 151 of the processed-pixel is calculated by the following equation.

$$Pp = \text{floor}(Cnt/Xw \times 255 - 128) \quad (2)$$

Here Cnt is information indicating at what number pixel from a left side portion of the image a processed-pixel is positioned at, Xw is a number of pixels corresponding to the effective main scanning range of the photoreceptor 151, and floor( ) is a floor function.

The spot diameter table is created in advance based on a result of measuring the spot diameter on a photosensitive drum at a time of manufacturing, a simulation at the time of designing, or the like, and are held. As previously described, the spot diameter with respect to a position on the photosensitive drum does not change uniformly, but changes nonlinearly. Therefore, it is desirable to create the spot diameter table based on only a number of pieces of data sufficient to smoothly represent change of the spot diameter in the main scanning direction (256 pieces of data in the example illustrated). At the least, creation of the spot diameter table requires performing a plurality of measurements of the spot diameter at non-representative positions that are described later.

A ratio acquisition unit 404 uses the blend ratio table held by the holding unit 412 to acquire a ratio Rb corresponding to a spot diameter acquired by the spot diameter acquisition unit 403. FIG. 6B illustrates an example of a blend ratio table. The blend ratio table holds ratios corresponding to several spot diameters (in FIG. 6B, spot diameters that are integer values) between a first spot diameter and a second spot diameter. The ratio acquisition unit 404 acquires the ratio Rb which corresponds to a spot diameter input from the spot diameter acquisition unit 403 or a spot diameter closest to the input spot diameter.

The blending unit 405 outputs tone correction data Dc that blends the first correction data D1 and the second correction data D2 by the following equation, based on the ratio Rb input from the ratio acquisition unit 404.

$$Dc = int\{(1-Rb) \times D1 + Rb \times D2\} \quad (3)$$

Here, $0 \leq Rb \leq 1$, and int( ) is a function for truncating past a decimal point.

The tone correction data Dc calculated here is input to the halftone processing unit 305. The image forming controller 103 generates a drive signal for the light-emitting element 1531 of the exposure unit 153 on which a pulse width modulation has been performed based on data on which halftone processing has been performed, and supplies the drive signal to the image forming unit 150*a*. In addition, although FIG. 5 illustrates two holding units 411 and 412 that are configured by flash memories or EEPROM for example, configuration may be taken such that the first and second tone correction tables, the spot diameter table, and the blend ratio table are held in one holding unit. Alternatively, configuration may be taken such that the first and second tone correction tables, the spot diameter table, and the blend ratio table are each held in a mutually different holding units.

Image Data Processing

Figure 11:
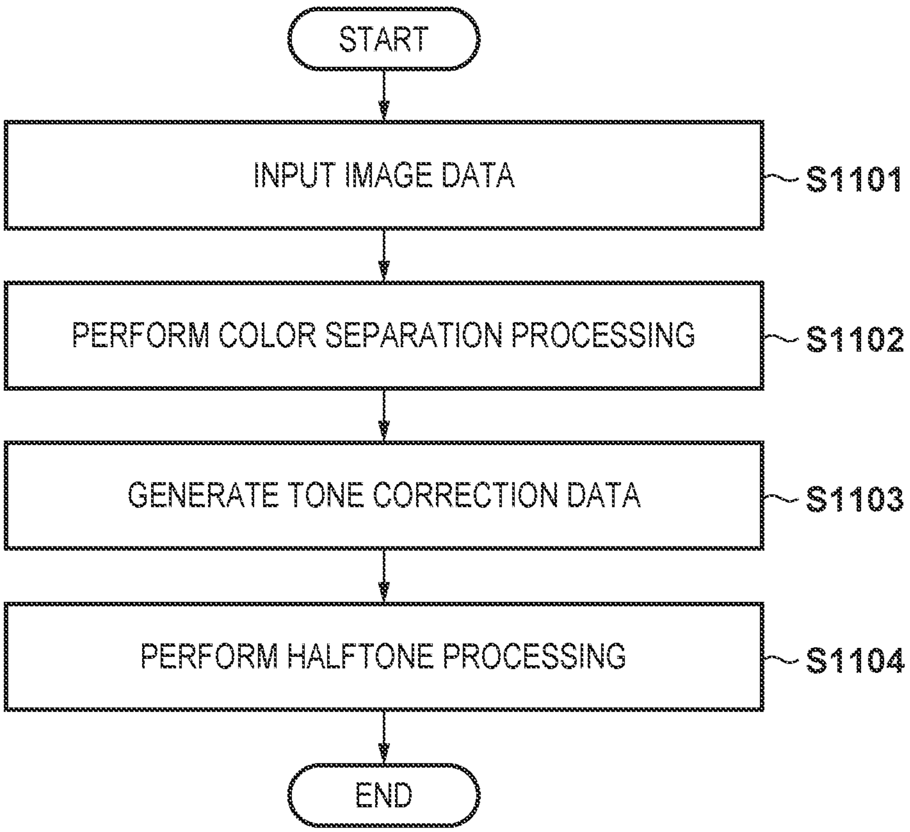
FIG. 11 is a flowchart illustrating processing of an image data processing unit.

As illustrated in FIG. 11, the image data processing unit 102 of the present embodiment performs, similarly to usual, processing in an order of input of image data (step S1101), color separation processing (step S1102), generation processing for tone correction data (step S1103) and halftone processing (step S1104). A feature of the present invention is in the processing details of the generation processing for the tone correction data (step S1103). Generation processing for tone correction data (step S1103) is performed based on the formation position Pp on the photoreceptor 151 and the pixel value of a pixel, for each of all pixels of image data of each color of CMYK generated by the color separating unit 302. A calculation method for the formation position Pp is as previously described.

Generation Processing for Tone Correction Data

Figure 7:
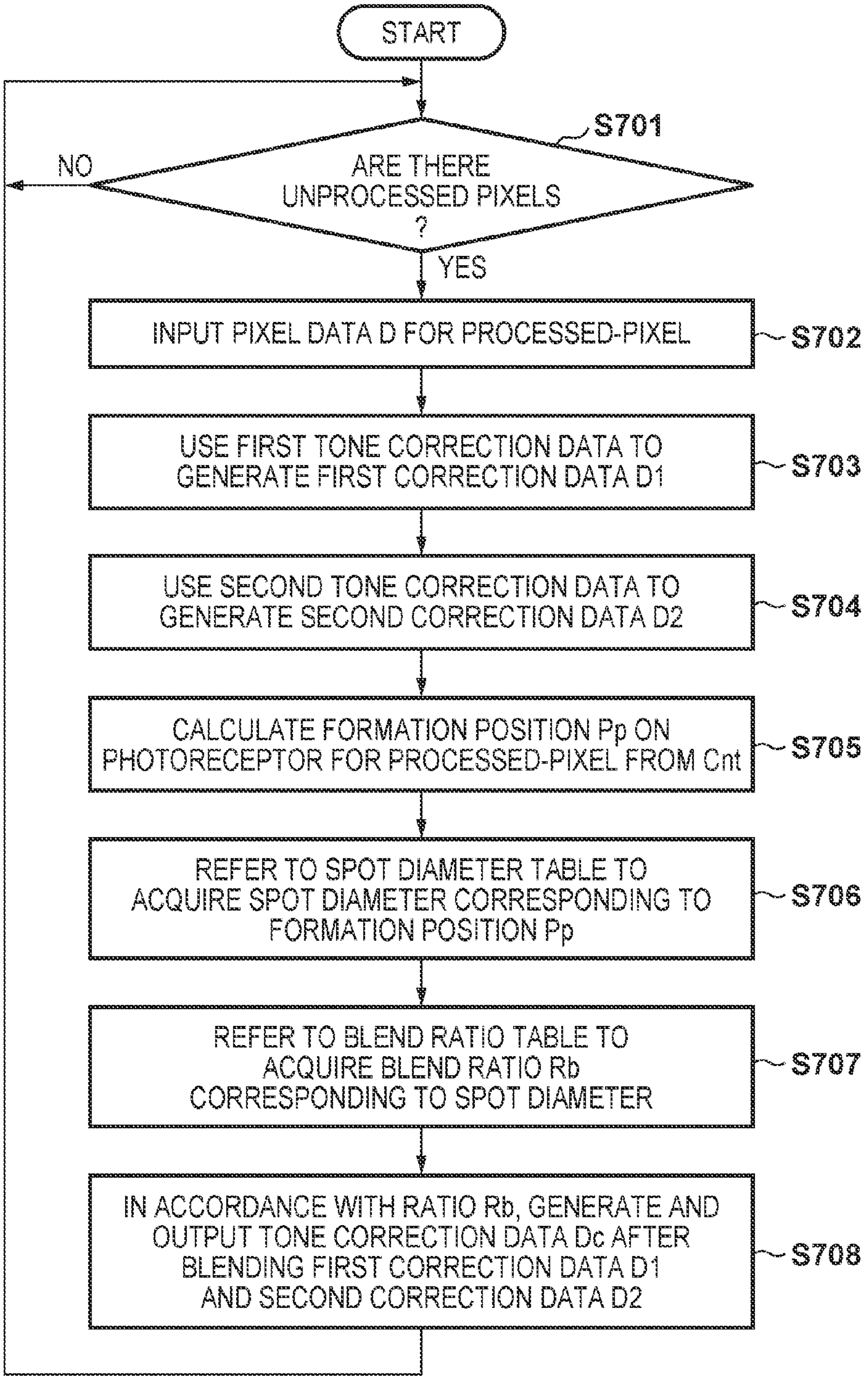
FIG. 7 is a flowchart for describing processing for generating tone correction data from pixel data.

The flowchart of FIG. 7 describes processing for generating tone correction data from pixel data. The tone correction unit 304 determines whether there are unprocessed pixels (step S701), and if there are unprocessed pixels designates one pixel of the unprocessed pixels as a processed-pixel. The first and the second correction units 401 and 402 input the pixel data D for the processed-pixel (step S702). The first correction unit 401 uses the first tone correction table to generate first correction data D1 that corrects the pixel data D (step S703). The second correction unit 402 uses the second tone correction table to generate second correction data D2 that corrects the pixel data D (step S704).

The spot diameter acquisition unit 403 calculates the formation position Pp on the photoreceptor 151 for the processed-pixel by the above Equation (2) (step S705) and acquires a spot diameter for the formation position Pp from the spot diameter table (step S706). The ratio acquisition unit 404 acquires from the blend ratio table the ratio Rb which corresponds to a spot diameter input from the spot diameter acquisition unit 403 (step S707). The blending unit 405 generates and outputs tone correction data Dc that blends the first correction data D1 and the second correction data D2, based on the ratio Rb input from the ratio acquisition unit 404 (step S708). After output of the tone correction data Dc, the processing returns to step S701, and if there are unprocessed pixels the processing of step S702 to step S708 is repeated. FIG. 7 illustrates just processing that corresponds to pixel data of a cyan component for example, but processing of other color components is executed similarly.

In this way, at the least a tone correction table having tone correction properties corresponding to the spot diameter SS1 and a tone correction table having tone correction properties corresponding to the spot diameter SS2 (>SS1) are used to generate two pieces of correction data for which a tone correction is performed. By blending the pieces of correction data in accordance with the ratio Rb based on the spot diameter corresponding to the formation position on the photoreceptor of the processed-pixel, substantially a tone correction is performed by the pixel data of the processed-pixel in accordance with the tone correction property corresponding to the formation position on the photoreceptor of the processed-pixel. Therefore, it is possible to absorb differences in tone characteristics caused by change of the spot diameter and realize suitable inplane uneven density correction that has a small correction residual.

Note that, in the present embodiment, a spot diameter accordance to the formation position is calculated by referring to the spot diameter table, and the blend ratio Rb is calculated by referring to the blend ratio table. In such a case, by newly creating only the spot diameter table by re-measuring the spot diameter in the image forming apparatus 101, it is possible for the blend ratio table to support change over time of the spot diameter while using the blend ratio table unchanged. However, configuration may be taken to combine the spot diameter table and the blend ratio table to create and store a table for acquiring the blend ratio directly from the formation position Pp on the photoreceptor 151 of the processed-pixel. A table associated with the formation position and the blend ratio in such a case is a table that associates the formation position and the blend position based on nonlinearities of spot diameter change. Specifically, the spot diameter is measured for each formation position as illustrated in FIG. 4 at a time of manufacturing or at design time, and acquire a characteristic in which the spot diameter changes nonlinearly. Referring to the blend ratio Rb which corresponds to the spot diameter, each formation position is associated with the blend ratio Rb. Because of this, it is possible to directly derive the blend ratio Rb from the formation position while considering the spot diameter.

[Variation]

Although explanation was given above that it is sufficient if the first tone correction table and the second tone correction table correspond to two different spot diameters SS1 and SS2 and that it is desirable for the spot diameter to satisfy Equation (1), for example correspondence as follows may be used.

SS1: corresponds to a spot diameter of light for forming an image on a surface of the photoreceptor 151 (or exposing the surface) at a central portion of the effective main scanning range of the photoreceptor 151, and SS2: corresponds to a spot diameter for forming an image on the surface of the photoreceptor 151 (or exposing the surface) at an end portion of the effective main scanning range of the photoreceptor 151 (an effective main scanning start point or an effective main scanning end point).

Alternatively:

SS1: corresponds to a smallest spot diameter for light for forming an image on the surface of the photoreceptor 151 (or exposing the surface), and SS2: corresponds to a largest spot diameter for light for forming an image on the surface of the photoreceptor 151 (or exposing the surface).

Explanation was given above of an example of generating two pieces of correction data by correcting the pixel data based on two tone correction properties: a tone correction property corresponding to a minimum spot diameter and a tone correction property corresponding to a maximum spot diameter, in the effective main scanning range of the photoreceptor. As previously described, because the blend ratio Rb is calculated based on the spot diameter in the present embodiment, by holding two tone correction properties, it is possible to obtain a result having sufficiently high correction precision even for a non-representative position. However, the tone correction properties and pieces of correction data used are not limited to two of each, and may be three or more.

For example, a small-diameter tone correction table corresponding to the minimum spot diameter SS1, a large-diameter tone correction table corresponding to the maximum spot diameter SS2, and a medium-diameter tone correction table corresponding to a spot diameter SSm between the minimum spot diameter and the maximum spot diameter are prepared. Correction data D1 is generated by correcting the pixel data based on the small-diameter tone correction table, correction data D2 is generated by correcting the pixel data based on the medium-diameter tone correction table, and correction data D3 is generated by correcting the pixel data based on the large-diameter tone correction table.

In such a case, a ratio $R_{D1}:R_{D2}:R_{D3}$ acquired by the ratio acquisition unit 404 becomes as the following equation in accordance with the spot diameter SSd which corresponds to a formation position on the photoreceptor of a pixel corresponding to the pixel data.

$$
\begin{aligned}
&\text{if } (SS1 \le SSd < SSm)\ \{ \\
&\quad 0 \le R_{D1} \le 1\ ; \\
&\quad 0 \le R_{D2} \le 1\ ; \\
&\quad R_{D3} = 0\ ; \\
&\} \\
&\text{if } (SSm \le SSd \le SS2)\ \{ \\
&\quad R_{D1} = 0\ ; \\
&\quad 0 \le R_{D2} \le 1\ ; \\
&\quad 0 \le R_{D3} \le 1\ ; \\
&\} \\
&\text{However, } R_{D1} + R_{D2} + R_{D3} = 1.
\end{aligned}
\tag{4}
$$

The blending unit 405 outputs tone correction data Dc that blends the correction data D1, D2, and D3 by the following equation, based on the ratio $R_{D1}:R_{D2}:R_{D3}$ input from the ratio acquisition unit 404.

$$\text{if } (R_{D3}{=}{=}0)$$

$$Dc=int\{(R_{D1}\times D1+R_{D2}\times D2\};$$

$$\text{if } (RD1{=}{=}0)$$

$$Dc=int\{(R_{D2}\times D2+R_{D3}\times D3\}; \tag{5}$$

In this way, it is possible to select a tone correction property to set as a reference from a plurality of tone correction properties, based on the spot diameter SSd which corresponds to the formation position on the photoreceptor of the pixel. However, it goes without saying that having few tone correction tables makes it possible to realize a low calculation amount and a low memory capacity for holding tone correction properties.

A method of using tone correction properties obtained by a linear interpolation of tone correction properties of representative positions based on a relation between representative positions and non-representative positions on a photoreceptor to perform a tone correction of a non-representative position is likely to be subject to effects from change of the spot diameter, and correction residuals become larger in a region where the spot diameter changes sharply. Such a tone correction method is referred to as a “formation position based tone correction method”.

In contrast to this, a method of using tone correction properties obtained by performing a linear interpolation of tone correction properties corresponding to spot diameters to perform a tone correction based on the spot diameters is unlikely to be subject to an effect of change of the spot diameter, and can suppress a correction residual to be small in a region where the spot diameter changes sharply. Such a tone correction method of the embodiment is referred to as a "spot diameter based tone correction method".

Second Embodiment

Below, description is given of an image forming apparatus, an image processing apparatus, and an image processing method of a second embodiment according to the present invention. Note that, in the second embodiment, for configurations approximately similar to that in the first embodiment, there are cases in which the same reference numerals are added and detailed description thereof is omitted. In the first embodiments, description was given for inplane uneven density correction by a spot diameter based tone correction method. In the second embodiment, explanation is given of inplane uneven density correction that adds processing for correcting intensity of light for exposing the surface of the photoreceptor in accordance with the spot diameter (hereinafter, spot diameter based exposure amount correction) to processing in accordance with a spot diameter based tone correction method.

Figure 8:
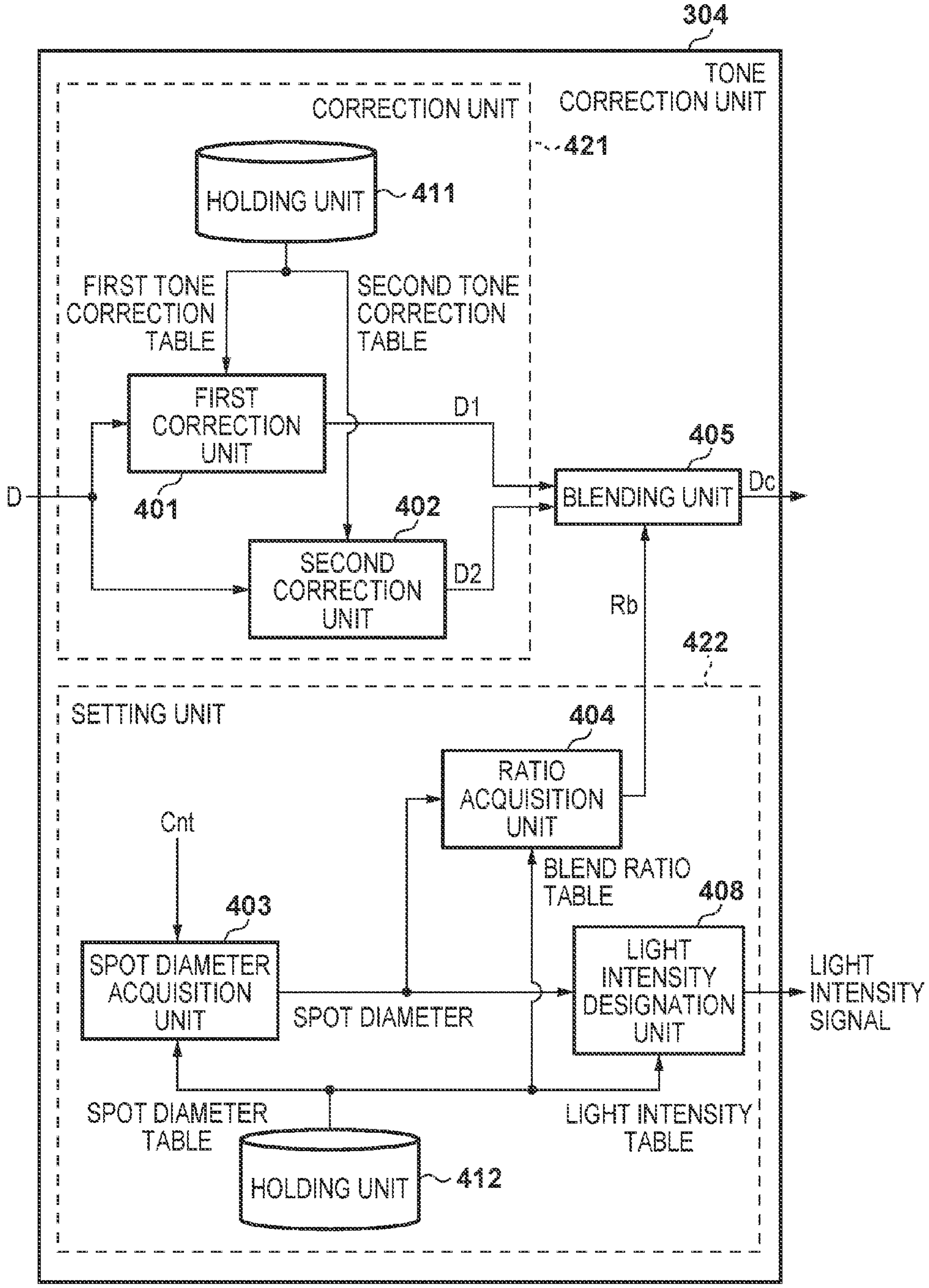
FIG. 8 is a block diagram illustrating an example configuration of a tone correction unit of the second embodiment.

The block diagram of FIG. 8 illustrates an example configuration of the tone correction unit 304 of the second embodiment. A portion different to the configuration of the first embodiment is a point that a light intensity designation unit 408 is added to the setting unit 422. The light intensity designation unit 408 acquires, from a light intensity table held in the holding unit 412, a light intensity signal value corresponding to a spot diameter input from the spot diameter acquisition unit 403.

FIG. 9 is a view illustrating an example of a light intensity table. The light intensity table indicates light intensity signal values corresponding to optimal light intensities at a time of exposure for a plurality of spot diameters (in FIG. 9, integer value spot diameters), and holds light intensity signal values corresponding to several spot diameters between the first spot diameter and the second spot diameter. As illustrated in FIG. 9, the light intensity table has a characteristic in that the light intensity signal value increases as the spot diameter increases, to compensate for exposure intensity that weakens as the spot diameter widens. A light intensity signal value output by the light intensity designation unit 408 is input to the exposure unit 153 of the image forming unit 150*a*. The exposure unit 153 controls the light intensity of a laser beam output by the light-emitting element 1531 in accordance with the light intensity signal value. Consequently, the exposure amount at the formation position Pp on the photoreceptor 151 of the processed-pixel is controlled based on the light intensity signal value output by the light intensity designation unit 408.

Figure 10:
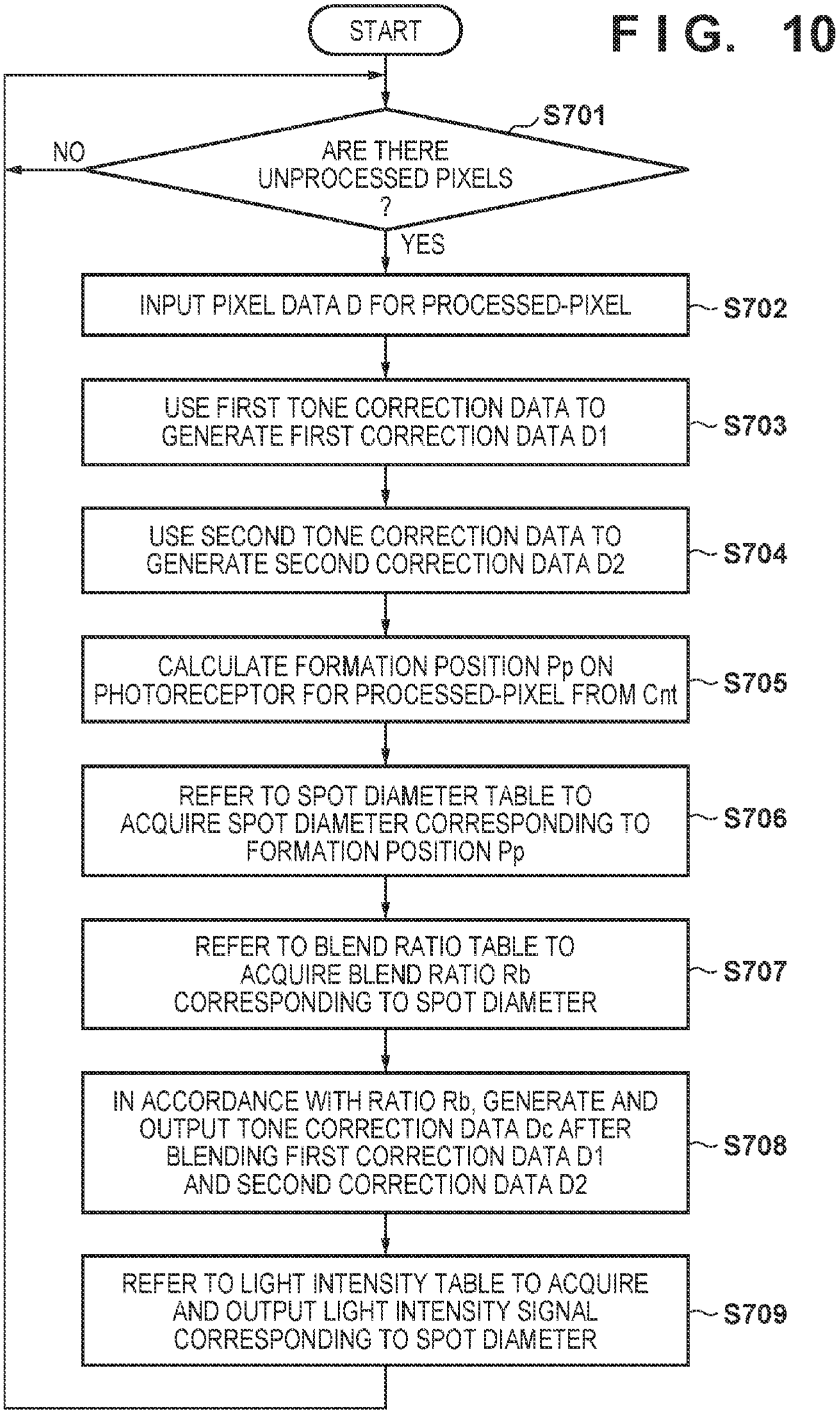
FIG. 10 is a flowchart for describing output of a light intensity signal and tone correction data in the second embodiment.

The flowchart of FIG. 10 is for explaining output of the light intensity signal and the tone correction data in the second embodiment. Processing of step S701 to step S708 is similar to the processing of the first embodiment illustrated in FIG. 7, and a detailed description is omitted. The light intensity designation unit 408 acquires, from a light intensity table, a light intensity signal corresponding to a spot diameter input from the spot diameter acquisition unit 403 and outputs it (step S709). Note that, if a record that matches the spot diameter is not in the light intensity table, the light intensity designation unit 408 acquires a light intensity signal corresponding to a spot diameter closest to this spot diameter.

After output of the light intensity signal, the processing returns to step S701, and the processing of step S702 to step S709 is repeated. FIG. 10 illustrates just processing that corresponds to pixel data of a cyan component for example, but processing of other color components is executed similarly. In this way, by performing spot diameter based exposure amount correction in addition to processing in accordance with the spot diameter based tone correction method, it is possible to effectively suppress inplane uneven density.

[Variation]

Explanation was given above of an example of performing processing that uses tables such as a tone correction table, a spot diameter table, a blend ratio table, and a light intensity table, but a matrix operation or a function that approximates input-output characteristics of a table may be used in place of the table.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-224233, filed Nov. 16, 2015, which is hereby incorporated by reference herein in its entirety.

What is claimed is:

1. An image processing apparatus comprising:

a holding unit configured to hold information indicating spot diameters of light, at positions along a main scanning direction, exposed on a surface of a photoreceptor;

a correction unit configured to generate, from pixel data of interest, a plurality of pieces of correction data based on a plurality of tone correction properties respectively corresponding to a plurality of representative spot diameters of light exposed on the surface of the photoreceptor;

a setting unit configured to determine a spot diameter, based on position of the pixel of interest, referring to the holding unit and to set a blending ratio based on the determined spot diameter; and a blending unit configured to blend, based on the blending ratio, the plurality of pieces of correction data to generate corrected data for the pixel of interest.

2. The apparatus according to claim 1, wherein the correction unit comprises:

a unit configured to generate, as one of the plurality of pieces of correction data, first correction data that corrects the pixel data of interest based on a tone correction property corresponding to a first representative spot diameter of the light; and a unit configured to generate, as one of the plurality of pieces of correction data, second correction data that corrects the pixel data of interest based on a tone correction property corresponding to a second representative spot diameter of the light.

3. The apparatus according to claim 2, wherein the first representative spot diameter corresponds to a spot diameter of the light at a central portion of an effective main scanning range of the photoreceptor and the second representative spot diameter corresponds to a spot diameter of the light at an end portion of the effective main scanning range.

4. The apparatus according to claim 2, wherein the first representative spot diameter corresponds to a smallest spot diameter of the light and the second representative spot diameter corresponds to a largest spot diameter of the light.

5. The apparatus according to claim 1, wherein the correction unit comprises a unit configured to generate, as one of the plurality of pieces of correction data, first correction data that corrects the pixel data of interest based on a tone correction property corresponding to a smallest spot diameter of the light; and a unit configured to generate, as one of the plurality of pieces of correction data, second correction data that corrects the pixel data of interest based on a tone correction property corresponding to a largest spot diameter of the light; and a unit configured to generate, as one of the plurality of pieces of correction data, third correction data that corrects the pixel data of interest based on a tone correction property corresponding to a spot diameter between the smallest and the largest spot diameters.

6. The apparatus according to claim 1, wherein the holding unit further holds information indicating blending ratios for a plurality of spot diameters different from each other, and wherein setting unit acquires, from the holding unit, the spot diameter based on the position of the pixel of interest and acquires, from the holding unit, the blending ratio based on the acquired spot diameter.

7. The apparatus according to claim 6, wherein the hold unit further holds information indicating light intensity signal corresponding to a plurality of spot diameters different from each other, wherein the setting unit acquires, from the holding unit, a light intensity signal based on the acquired spot diameter to control an exposure amount for the pixel of interest.

8. The apparatus according to claim 7, wherein the information indicating light intensity has a characteristic that the light intensity signal value increases as the spot diameter increases.

9. The apparatus according to claim 7, further comprising a drive signal generation unit configured to generate, based on corrected data generated by the blending unit, a drive signal for a light-emitting element to emit light that irradiates the photoreceptor, and wherein the drive signal and the light intensity signal are output to an image forming apparatus which has the photoreceptor.

10. The apparatus according to claim 1, further comprising an image formation unit configured to perform an image formation based on corrected data generated by the blending unit.

11. A method for controlling an image processing apparatus, the method comprising:

generating, from pixel data of interest, a plurality of pieces of correction data based on a plurality of tone correction properties respectively corresponding to a plurality of representative spot diameters of light exposed on a surface of a photoreceptor;

determining a spot diameter, based on position of the pixel of interest, by referring to a predetermined holding unit that holds information indicating spot diameters of light, at positions along a main scanning direction, exposed on the surface of the photoreceptor;

setting a blending ratio based on the determined spot diameter; and blending the plurality of pieces of correction data based on the blending ratio to generate corrected data of the pixel of interest.

12. A non-transitory computer-readable storage medium storing a program which causes a computer to execute steps of a method for controlling an image processing apparatus, the method comprising:

generating, from pixel data of interest, a plurality of pieces of correction data based on a plurality of tone correction properties respectively corresponding to a plurality of representative spot diameters of light exposed on a surface of a photoreceptor;

determining a spot diameter, based on position of the pixel of interest, by referring to a predetermined holding unit that holds information indicating spot diameters of light, at positions along a main scanning direction, exposed on the surface of the photoreceptor;

setting a blending ratio based on the determined spot diameter; and blending the plurality of pieces of correction data based on the blending ratio to generate corrected data of the pixel of interest.

* * * * *